United States Patent
Lee et al.

(10) Patent No.: US 8,352,580 B2
(45) Date of Patent: Jan. 8, 2013

(54) SERVER AND METHOD FOR PROVIDING MOBILE WEB SERVICE

(75) Inventors: Jae-won Lee, Yongin-si (KR); Joon-sung Hong, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 77 days.

(21) Appl. No.: 12/546,720

(22) Filed: Aug. 25, 2009

(65) Prior Publication Data

US 2010/0131583 A1 May 27, 2010

(30) Foreign Application Priority Data

Nov. 21, 2008 (KR) .................. 10-2008-0116427
Mar. 23, 2009 (KR) .................. 10-2009-0024522

(51) Int. Cl.
*G06F 15/177* (2006.01)
(52) U.S. Cl. ........ 709/220; 709/217; 709/219; 709/245; 455/428
(58) Field of Classification Search .................. 709/217, 709/219, 220, 245; 455/428
See application file for complete search history.

(56) References Cited

U.S. PATENT DOCUMENTS

| | | | |
|---|---|---|---|
| 5,826,000 A * | 10/1998 | Hamilton | 714/4.1 |
| 7,305,230 B2 * | 12/2007 | Zhigang | 455/414.1 |
| 7,447,182 B2 * | 11/2008 | Chowdhury et al. | 370/338 |
| 7,486,967 B2 * | 2/2009 | Pan et al. | 455/560 |
| 7,523,491 B2 * | 4/2009 | Dosa Racz et al. | 726/11 |
| 7,620,404 B2 * | 11/2009 | Chesnais et al. | 455/456.1 |
| 2006/0200541 A1 | 9/2006 | Wikman et al. | |

FOREIGN PATENT DOCUMENTS

| | | |
|---|---|---|
| KR | 10-2004-0028397 | 4/2004 |
| KR | 100809441 | 2/2008 |
| KR | 100817582 | 3/2008 |
| KR | 100828920 | 5/2008 |

* cited by examiner

*Primary Examiner* — David Lazaro
*Assistant Examiner* — Marie Georges Henry
(74) *Attorney, Agent, or Firm* — NSIP Law

(57) ABSTRACT

A server for a mobile web service and a method for providing a web service are provided. The wired server stores an IP address of at least one mobile web server. When a request for access to a mobile web server is received, the wired server delivers the access request to the mobile web server or provides a service in place of the mobile web server, using a URL included in the access request.

16 Claims, 5 Drawing Sheets

SERVER AND METHOD FOR PROVIDING MOBILE WEB SERVICE

CROSS-REFERENCE TO RELATED APPLICATION(S)

This application claims the benefit under 35 U.S.C. §119(a) of Korean Patent Application Nos. 10-2008-116427, filed on Nov. 21, 2008, and 10-2009-24522, filed on Mar. 23, 2009, the disclosures of which are incorporated herein in its entirety by reference for all purposes.

BACKGROUND

1. Field

The following description relates to a system to provide a web service, and more particularly, to a system that uses a mobile web server to provide a mobile web service.

2. Description of the Related Art

Mobile phones have been evolving and are recognized as one of the most important devices in an individual's life. Mobile phones enrich life in ways that go beyond its basic function of enabling telecommunication. Benefiting from digital convergence, visual records of day-to-day life can be created using a camera function of a mobile phone. The mobile phone can be further equipped to assist other aspects of a person's daily life, including managing one's schedule and acquaintance, keeping personal memos, playing games, listening/watching music/movies, making purchases, and the like.

Moreover, a mobile phone has been recently utilized as a user-created content (UCC) authoring tool. The mobile phone has been widely utilized as a publishing tool, such as by directly uploading contents created by the mobile phone onto the Internet and sharing the contents with other people. Since the mobile phone is made to be portable, it typically has limitations with regard to usability and performance. For example, it is inconvenient to use a mobile phone to interwork with and share contents via Internet service tailored to personal computers (PCs) as basic clients. Accordingly, contents created or stored in a mobile phone are normally uploaded to a web server which is then accessed by other clients to share the contents.

A way is being sought to directly access contents created or stored by a terminal using a mobile phone as a web server, through an external web browser. In a method by which a client directly accesses a mobile phone, a user providing contents using the mobile phone may only create or store contents and may not upload or transmit additional contents. However, when all processes are performed by the mobile server in response to a request from an external client, a large amount of the terminal's resources are consumed, and it is difficult to provide full service due to limited performance of the terminal. Also, when the mobile server cannot be accessed, for example, when the terminal functioning as the mobile server is powered off or is busy, service cannot be provided to an external client.

SUMMARY

According to one general aspect, there is provided a wired server for a mobile web service, including a database configured to store an IP address of at least one mobile web server, and a network controller configured to control access to a mobile web server using an IP address of the mobile web server retrieved from the database in response to a request for access to the mobile web server.

The request for access to the mobile web server may include a URL indicating a location of content for web service provided by the mobile web server.

The wired server may further include a service agent configured to provide a service provided by the mobile web server in place of the mobile web server, wherein in response to the request for access to the mobile web server being a request for access to the service provided by the service agent, the network controller controls the service agent to handle the request.

The network controller may determine whether a web service that can be provided by the service agent in place of the mobile web server is requested, using a URL indicating a location of content for web service provided by the mobile web server, the URL being included in the request for access to the mobile web server.

The network controller may use a URL of a new mobile web server to register the new mobile web server.

The network controller may perform a login task using the URL of the new mobile web server as an ID of the new mobile web server.

The network controller may filter the request for access to the mobile web server to restrict the request for access to the mobile web server.

According to another general aspect, there is provided a method of operating a wired server to provide a mobile web service, the method including receiving a request for access to a mobile web server, and controlling access to the mobile web server using an IP address of the mobile web server retrieved from a database accessible by the wired server.

The request for access to the mobile web server may include a URL indicating a location of content for web service provided by the mobile web server.

The method may further include providing a service provided by the mobile web server in place of the mobile web server by the wired server.

The method may further include determining whether a web service that can be provided in place of the mobile web server is requested, using a URL indicating a location of content for web service provided by the mobile web server, the URL being included in the request for access to the mobile web server.

The method may further include registering a new mobile web server using a URL of the new mobile web server. A login task may be performed using the URL of the new mobile web server as an ID of the new mobile web server.

The method may further include filtering the request for access to the mobile web server to restrict the request for access to the mobile web server.

According to still another general aspect, there is provided a mobile web server for a mobile web service, including a user interface manager configured to provide a user interface with a user of the mobile web server, a storage unit configured to store content for web service, a communication unit configured to communicate with a wired server to register an IP address of the mobile web server in the wired server, and a controller configured to control the communication unit and control an operation of the mobile web server.

The communication unit may communicate with the wired server to register a URL of the mobile web server and use the URL as a user ID.

The communication unit may communicate with the wired server to deliver content that the wired server can provide in place of the mobile web server.

The mobile web server may be one of a portable phone, a personal digital assistant (PDA), a portable multimedia player device, a portable game console, and a portable camera device.

Other features and aspects will be apparent from the following detailed description, the drawings, and the claims.

Figure 1:
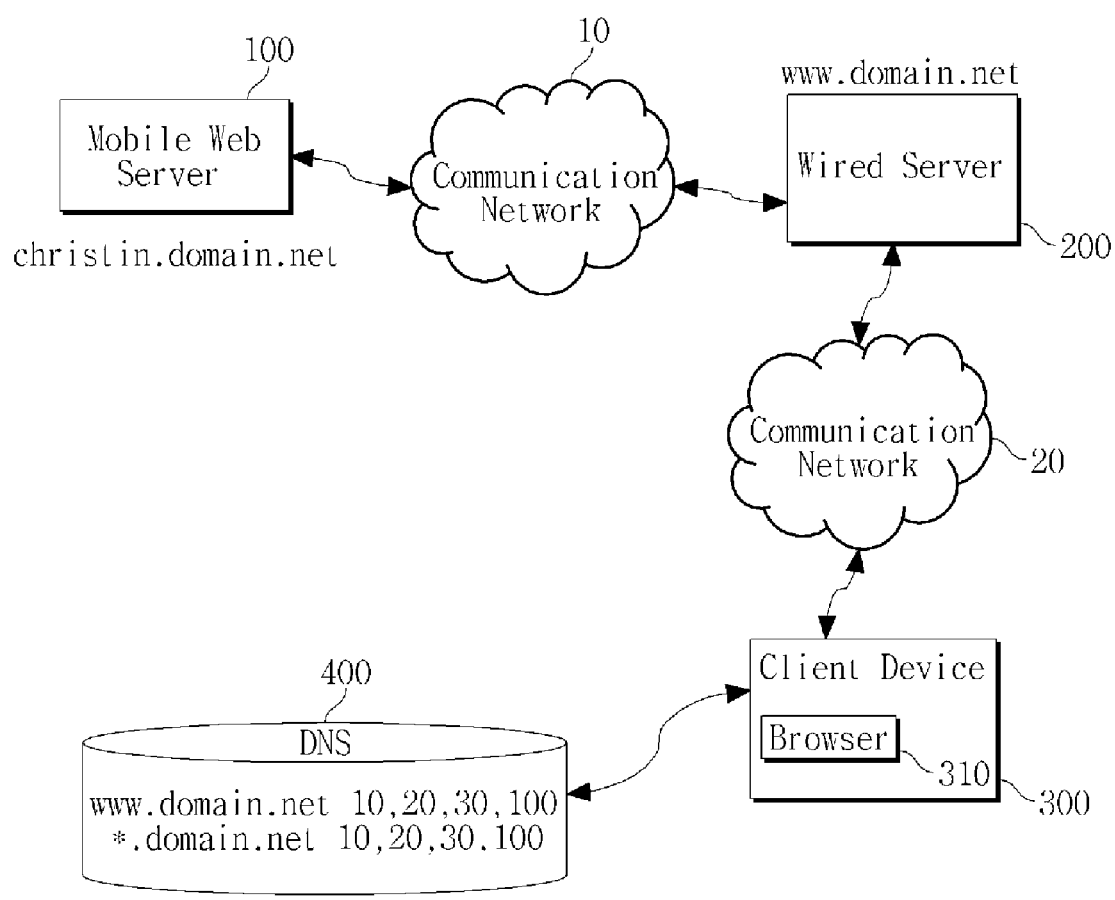
FIG. 1 is a diagram illustrating an exemplary network environment in which a mobile web server is accessed using a wired server for a mobile web service.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

FIG. 1 illustrates an exemplary network environment in which a mobile web server 100 is accessed using a wired server 200 for a mobile web service.

Referring to FIG. 1, the wired server 200 for a mobile web service (hereinafter, referred to as a wired server) is connected to the mobile web server 100 and a client device 300 via communication network(s). Communication between the mobile web server 100 and the wired server 200, and communication between the wired server 200 and the client device 300, may be based on a communication protocol such as hyper text transport protocol (HTTP). The mobile web server 100 may be a portable terminal capable of performing network communication, such as a portable phone, a personal digital assistant (PDA) and the like. The client device 300 may be a portable terminal similar to the mobile web server 100, or may be a stationary computing device such as a desktop computer.

The exemplary wired server 200 stores an IP address of at least one mobile web server. The wired server 200 may store IP addresses of a plurality of mobile web servers that have registered uniform resource locators (URLs) in the wired server 200, including the mobile web server 100, and completed a subscription procedure.

When a request for access to a mobile web server is received, the wired server 200 controls access to the mobile web server using the stored IP address. As an example, the wired server 200 may deliver some of the service requests to the mobile web server 100, and directly handle others instead of delivering them to the mobile web server 100.

When an existing IP address is changed due to dynamic IP-address allocation, the mobile web server 100 may deliver the changed IP address to the wired server 200 each time the IP address is changed. The mobile web server 100 may create and manage a client table, which includes a URL and an IP address of at least one web server, including the mobile web server 100.

The mobile web server 100 may store necessary data in the wired server 200 so as to have the wired server 200 handle some of the web services of the mobile web server 100. For example, the mobile web server 100 may store an initial screen file of the web service and contents for web service such as applications in a storage space of the wired server 200. The contents for web service may be stored in a specific directory in the storage space of the wired server 200 to be discerned by the mobile web server 100.

A user of the client device 300 may access the mobile web server 100 through the following exemplary process. The user of the client device 300 inputs a URL (http://christine.domain.net) of the mobile web server 100 to request a service of the mobile web server 100, to the web browser 310 and attempts to access the mobile web server 100.

The client device 300 obtains an IP address of the mobile web server 100 through a domain name system (DNS) server 400 in order to access the mobile web server 100 using the input URL. In this case, domains of the mobile web servers including the mobile web server 100 are registered as IPs of the wired server 200 in the DNS server 400, which operates on the Internet. For example, an IP address of URLs (*.domain.net) of all the mobile web servers that have registered their URLs in the wired server 200, including a URL (christine.domain.net) of the mobile web server 100, is registered as a URL (www.domain.net) IP address (10.20.30.100) of the wired server 200, as shown in FIG. 1. Accordingly, the wired server 200 may receive a request for access to the mobile web server 100 in advance of the mobile web server 100.

The wired server 200 controls access to the mobile web server 100 using the received URL. The wired server 200 may instead provide at least one of the services provided by the mobile web server 100. Here, the contents may include contents for application provision and execution, as well as media contents such as photographs, videos, and audio files.

The wired server 200 may provide some services, such as application program interface (API) for providing static contents such as an initial screen of a homepage and documents, or schedule information, among the services provided by the mobile web server 100, in place of the mobile web server 100. For example, when a request for access to the mobile web server 100 is received from the web browser 310 of the client device 300, the wired server 200 may provide an initial page (index.html) file (/var/www/users/christine/index.html) previously set by a user of the mobile web server 100 and stored in the wired server 200, to the web browser 310, instead of delivering the access request to the mobile web server 100.

That is, the wired server 200 may respond to the request for service of the mobile web server 100, managed by the wired server 200, using service stored in a corresponding directory of the wired server 200. For this, the wired server 200 may use a module for redirecting the request for access to the mobile web server 100 to a corresponding directory of the wired server 200. For example, an Apache web server may use a rewrite module.

When a URL with which the mobile web server 100 is to directly provide the web service is received, the wired server 200 delivers the received URL to the mobile web server 100. For example, when a URL (http://christine.domain.net/mobile/photos/PIC0002.jpg) of contents included in the initial page file is selected by the web browser 310, the wired server 200 determines that a URL in which a mobile directory is included in the domain of the mobile web server 100 requests the contents stored in the mobile web server 100. Accordingly, the wired server 200 delivers the URL to the mobile web server 100. In return, the mobile web server 100 may send the contents corresponding to the URL to the client device 300 through the wired server 200.

When the user of the mobile web server 100 stores a photograph acquired by a camera as a file /www/photos/PIC002.jpg, a URL of this file (http://christine.domain.net/mobile/photos/PIC0002.jpg) may be produced. The user of the mobile web server 100 may report the location of the contents by transmitting the URL of the contents to other users through a channel such as short message service (SMS) or e-mail, and the other users may access the photograph stored in the mobile web server 100 through the wired server 200, as described above. In this case, the mobile web server 100 recognizes that the wired server 200 has requested the file "PIC002.jpg", and transmits the file to the wired server 200, and the wired server 200 responds to the request by delivering the file to the web browser 300.

As described, the wired server 200 may handle some services, for example, static non-personalized services, instead of the mobile web server 100 handling all incoming requests and providing the corresponding services. Accordingly, efficiency of the web service and response speed to the web browser 310 may be improved. Also, since the wired server 200 may instead provide some of the services provided by the mobile web server 100, a load to the mobile web server 100 may be reduced and fuller and more secure services may be provided to the user of the client device 300.

Also, as the wired server 200 delivers a service request directed to the mobile web server 100, to the mobile web server 100, the wired server 200 may block external non-authorized service requests in advance. Accordingly, security of the mobile web server 100 may be reinforced.

Also, the user of the mobile web server 100 may transmits only a URL in his or her mobile web server without separately uploading contents created by the user, for example, a photograph taken and stored using a camera of a mobile phone, to an external server, in order to share the contents with other users who may directly access them using the URL.

Figure 2:
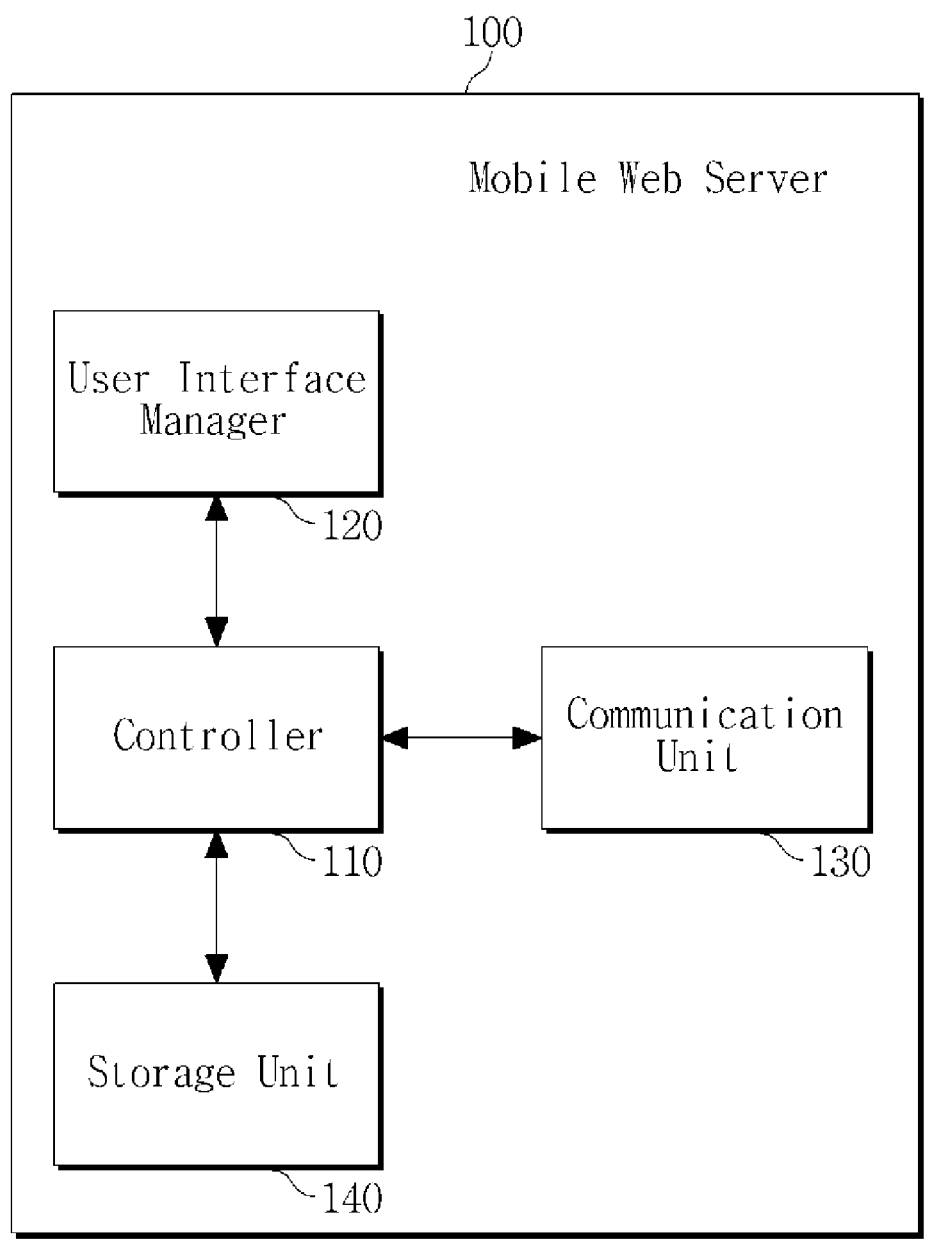
FIG. 2 is a block diagram illustrating an exemplary mobile web server.

FIG. 2 is a block diagram of an exemplary mobile web server 100.

The mobile web server 100 includes a controller 110, a user interface manager 120, a communication unit 130, and a storage unit 140.

The controller 110 controls overall operation of the mobile web server 100. The user interface manager 120 provides a user interface to allow a user of the mobile web server 100 to input data including contents for web service. The communication unit 130 controls network access. The storage unit 140 may include an operating system and a file system, and stores user-input contents for web service.

Exemplary operation of the mobile web server 100 follows.

To provide the web service using the wired server 200, the controller 110 controls the communication unit 130 so that a URL is registered in the wired server 200 for subscription, as illustrated in FIG. 1. When authentication is successfully performed, the controller 110 registers the IP address of the mobile web server 100 in the wired server 200.

The controller 110 performs a login process in the wired server 200 through the communication unit 130 in an initialization process and is authenticated by the wired server 200. Generally, the user is authenticated as a previously registered user by transmitting his or her ID and password to the server. The URL of the mobile web server 100 may be used as an ID in consideration of the fact that authentication is performed on the mobile web server 100 operated in, for example, a mobile phone, which may be a personal device of the user. A related Internet standard includes OpenID protocol. For example, since the URL of the mobile web server 100 of the user is "christine.domain.net," the wired server 200 may perform a login task using this URL as an ID.

Also, the user may initially subscribe to the wired server 200 to use the mobile web server 100. In the subscription process, the user may be allocated the URL of the mobile web server 100 and use the URL as a user ID. Accordingly, a need for separate management of the user ID may be avoided. The URL-based ID may be used as the user ID even in other Internet services accommodating existing OpenID protocol by applying OpenID protocol, which is a conventional Internet standard.

The controller 110 may set contents that the wired server 200 can provide in place of the mobile web server 100, for example, an initial page of a homepage and certain static contents, in response to a user input signal input from the user interface manager 120, and control the communication unit 130 to deliver the set contents to the wired server 200.

Figure 3:
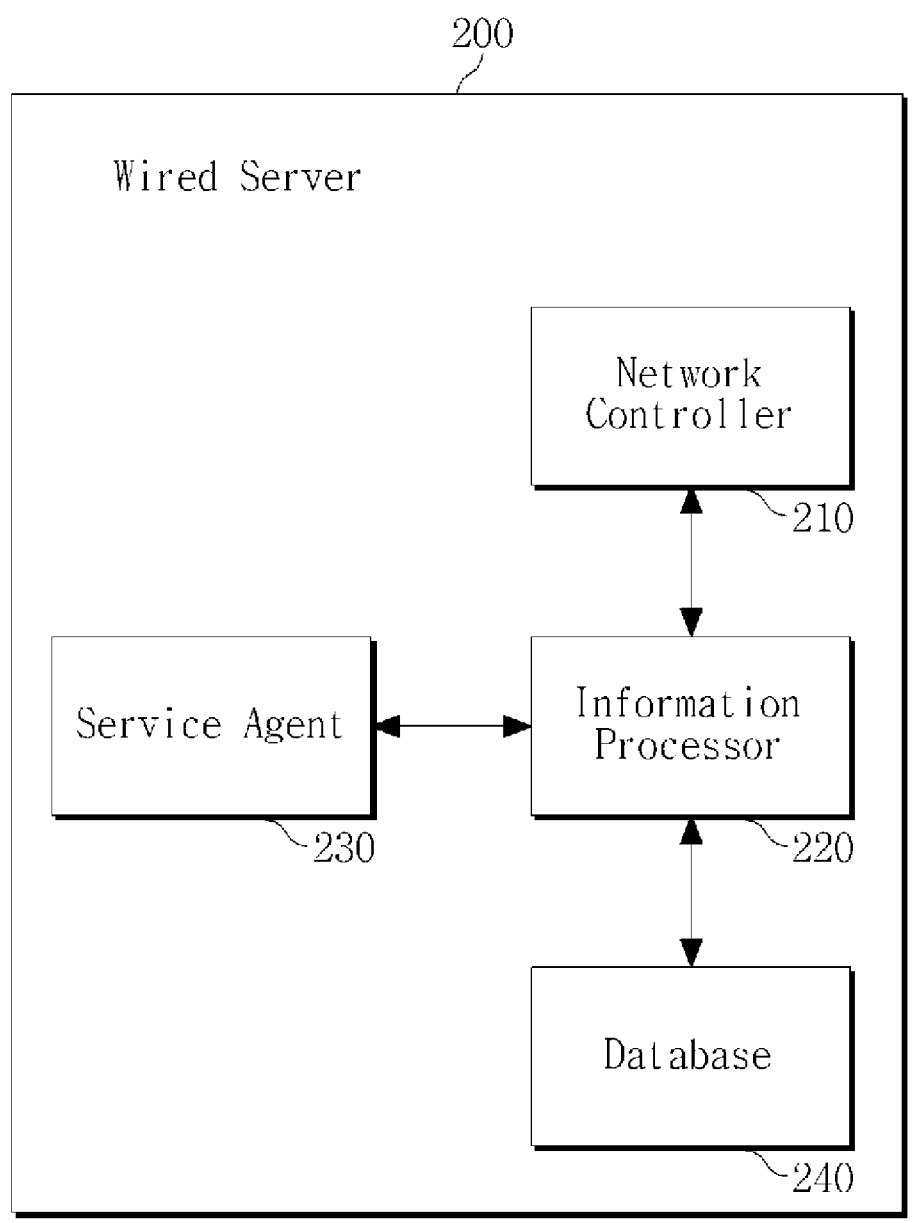
FIG. 3 is a block diagram illustrating an exemplary wired server to provide a mobile web service.

FIG. 3 is a block diagram of an exemplary wired server 200 to provide a mobile web service.

The wired server 200 includes a network controller 210, an information processor 220, a service agent 230, and a database 240.

The database 240 may include an operating system and a file system of the wired server 200. The database 240 of the wired server 200 may store IP addresses of at least one mobile web server. For example, the database 240 stores IP addresses corresponding to URLs of subscribed mobile web servers, and stores contents for web service of each mobile web server stored in the wired server 200.

Exemplary operation of the wired server 200 follows.

When a request for access to the mobile web server is received, for example, access to the mobile web server 100, the network controller 210 controls access to the mobile web server 100 using the IP address of the mobile web server 100 retrieved from the database 240. The request for access to at least one mobile web server may include a URL indicating a location of contents for web service provided by the at least one mobile web server.

The network controller 210 may restrict a request for access to the mobile web server 100 from a non-authorized client device by filtering a request for access to the mobile web server 100 from an authorized client device, using previously set client device identification information authorized to access the mobile web server 100.

The service agent 230 may provide at least one static service provided by the mobile web server 100 in place of the mobile web server 100. When the request for access to the mobile web server 100 is intended to access the service provided by the service agent 230, the network controller 210 may control the service agent 230 to process the request.

The network controller 210 may determine whether the web service that the service agent 230 can provide in place of the mobile web server 100 is requested, using a URL indicating a location of contents for web service provided by the mobile web server 100 which is included in the request for access to the mobile web server 100. For example, when information indicating a directory of the storage space of the mobile web server 100 is included in the URL received from the client device 300, the network controller 210 may deliver the received URL to the mobile web server 100.

The information processor 220 processes the information received from the network controller 210, stores the result of processing in the database 240, and processes information required for operation of the wired server 200.

Prior to a service process related to the mobile web server 100, the network controller 210 may perform an authentication task to register an IP address of a new mobile web server. When a login request from the mobile web server is received, the network controller 210 may use a URL of the mobile web server as an ID of the mobile web server in performing an authentication task in response to the login request.

Figure 4:
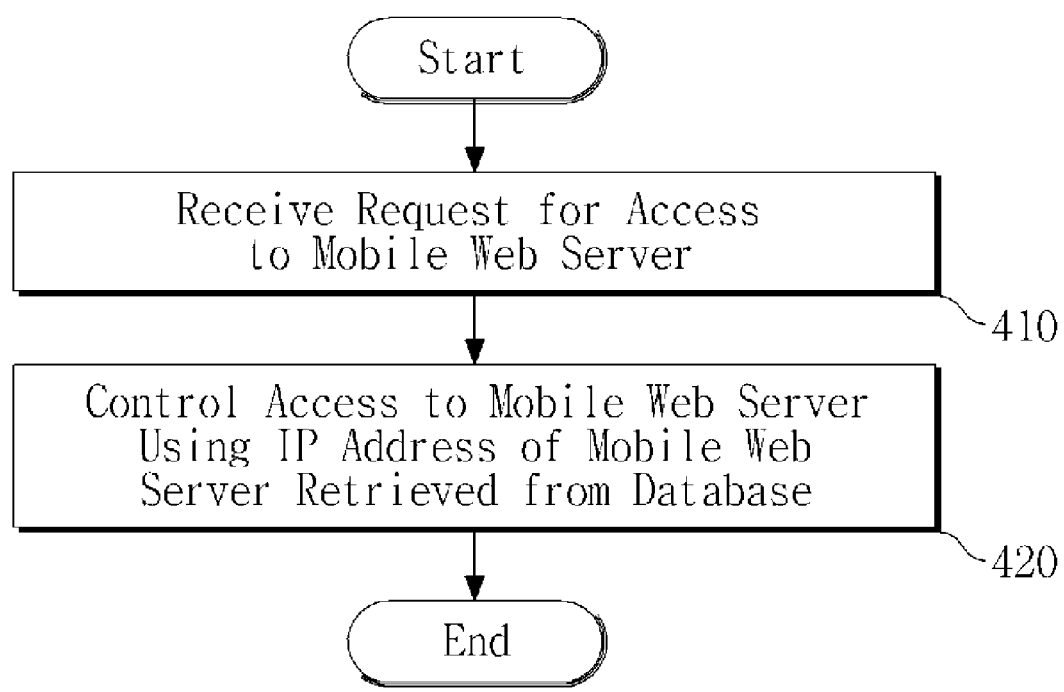
FIG. 4 is a flowchart illustrating an exemplary method of a wired server to provide a mobile web service.

FIG. 4 illustrates an exemplary method of a wired server 200 to provide a mobile web service.

The wired server 200 receives a request for access to at least one mobile web server in operation 410. The wired server 200 controls access to the mobile web server, for example, the mobile web server 100, using an IP address of the mobile web server 100 retrieved from a database, which stores the IP address of the at least one mobile web server, in operation 420.

It may be determined whether a web service that the wired server 200 can provide in place of the mobile web server 100 is requested using a URL indicating a location of contents for web service provided by the mobile web server 100, which is included in the request for access to the mobile web server 100. When it is determined that a web service that the wired server 200 can provide in place of the mobile web server 100 is requested, the wired server 200 may provide the web service to a client device requesting the access, instead of delivering the access request to the mobile web server 100.

Figure 5:
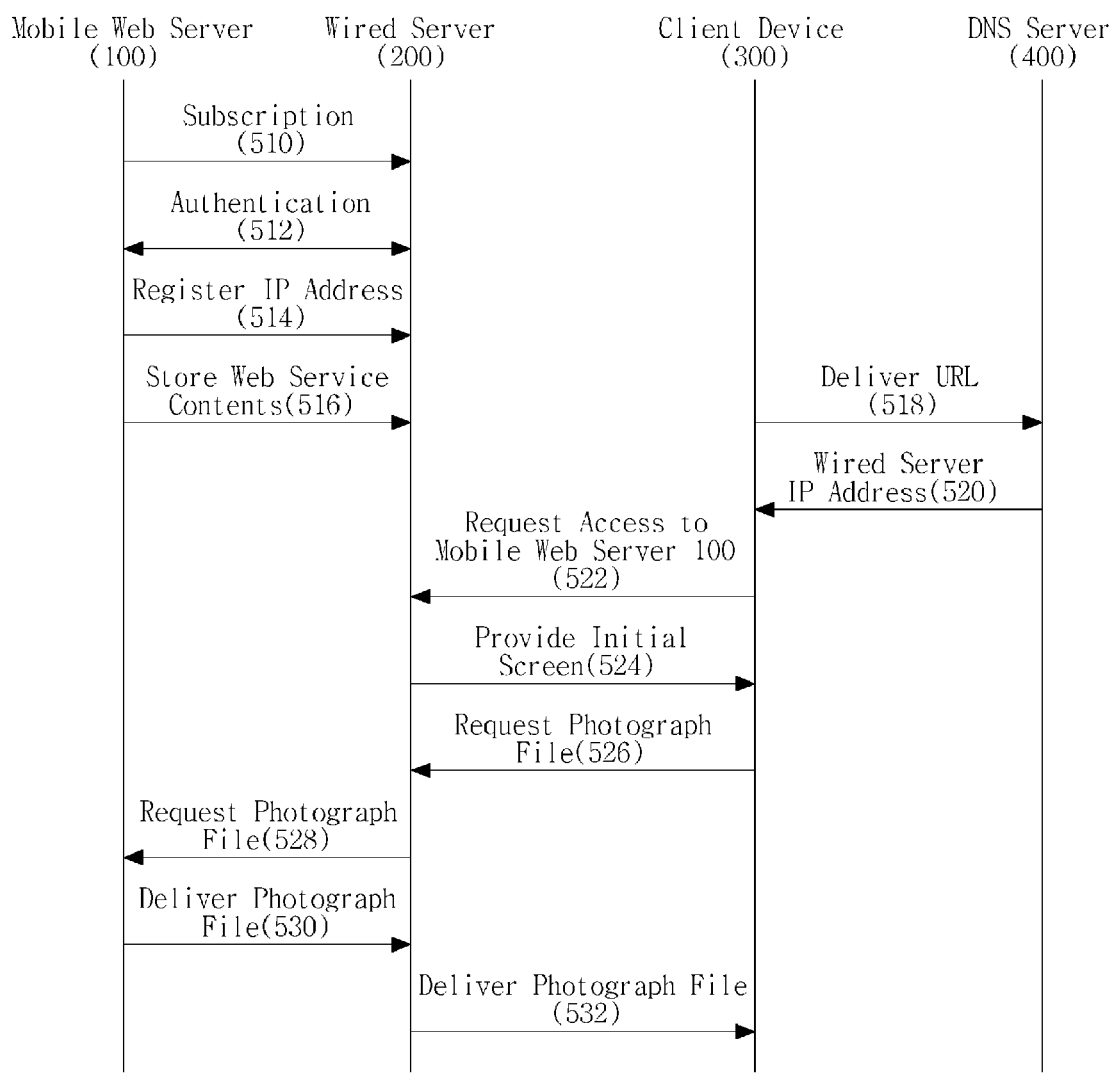
FIG. 5 is a diagram illustrating an exemplary method of providing a mobile web service using a wired server and a mobile web server.

FIG. 5 illustrates an exemplary method of providing a mobile web service using a wired server 200 and a mobile web server 100.

The mobile web server 100 desiring to provide a web service using the wired server 200 registers a URL in the wired server 200 and performs a subscription procedure in the wired server 200 in operation 510. Here, the URL may be allocated by the wired server 200.

The wired server 200 authenticates the mobile web server 100 using the URL received from the subscribed mobile web server 100 in operation 512. When authentication is successfully performed, the mobile web server 100 registers the IP address in the wired server 200 in operation 514. The mobile web server 100 stores contents for web service in the wired server 200 in operation 516.

When a client device 300 on a network desires to access the mobile web server 100, the client device 300 delivers a URL of the mobile web server 100 to a DNS server 400 and requests an IP address of the mobile web server 100 in operation 518. Since the IP address of the mobile web server 100 has been registered as the IP address of the wired server 200 in the DNS server 400, the DNS server 400 delivers the IP address of the wired server 200 to the client device 300 in operation 520.

The client device 300 transmits a request for access to the mobile web server 100 to the wired server 200 in operation 522. In this case, when the client device 300 requests an initial screen from the mobile web server 100, the wired server 200 may provide the initial screen of a homepage previously set by the mobile web server 100 to the client device 300 in operation 524.

When the client device 300 selects a photograph file on the initial screen, a URL including directory information of the mobile web server 100 in which the photograph file is stored is selected on the initial screen and transmitted to the wired server 200 to request the photograph file in operation 526. The wired server 200 may analyze the URL, and when contents directly managed by the mobile web server 100 are requested, the wired server 200 sends the URL to the mobile web server 100 to deliver the photograph file request in operation 528.

The mobile web server 100 searches for a photograph file corresponding to the received URL and delivers it to the wired server 200 in operation 530, and the wired server 200 delivers the photograph file to the client device 300 in operation 532.

According to certain example(s) described above, access to a mobile web server can be delivered through a wired server to cope with a malicious attack such as a distributed denial of service (DDOS) attack and block reckless access by external users. Also, efficiency of web service provided by the mobile web server may be improved by utilizing a cache of the wired server.

According to certain example(s) described above, efficient web service may be provided using limited resources of a mobile web server while maintaining high usability in sharing contents of the mobile web server with other clients by virtue of a wired server connected to the Internet.

The methods described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A wired server for a mobile web service, the wired server comprising:
   a database configured to store an IP address of at least one mobile web server;
   a network controller configured to control access to the at least one mobile web server, in response to a request for access to a service of at least one mobile web server including a URL, by determining the service of the at least one mobile web server is stored locally on the wired server, based on the received URL; and
   a service agent configured to provide the service of the at least one mobile web server, in place of the at least one mobile web server, using content of the at, least one mobile web server that is received from the at least one mobile web server and that is stored in the wired server, wherein an IP address of the at least one mobile server is registered as the IP address of the wired server in a domain name system (DNS) server such that the wired server receives the request for access to the service of the at least one mobile web server prior to the at least one mobile web server.

2. The wired server of claim 1, wherein the request for access to the at least one mobile web server comprises a URL indicating a location of content for the web service of the at least one mobile web server.

3. The wired server of claim 1, wherein:
in response to the request for access to the at least one mobile web server being a request for access to the service provided by the service agent, the network controller controls the service agent to handle the request.

4. The wired server of claim 3, wherein the network controller determines whether a web service can be provided by the service agent in place of the at least one mobile web server, using the URL indicating a location of content for the web service of the at least one mobile web server.

5. The wired server of claim 1, wherein the network controller uses a URL of a new mobile web server to register the new mobile web server.

6. The wired server of claim 5, wherein the network controller performs a login task using the URL of the new mobile web server as an ID of the new mobile web server.

7. The wired server of claim 1, wherein the network controller filters the request for access to the at least one mobile web server to restrict the request for access to the at least one mobile web server.

8. A method of operating a wired server to provide a mobile web service, the method comprising:
receiving a request for access to a service of a mobile web server, the request including a URL;
controlling access to the mobile web server by determining whether the service of the at least one mobile web server is stored locally on the wired server, based on the received URL; and
providing, by a service agent, the service of the mobile web server, in place of the mobile web server, using content of the mobile web server that is received from the at least one mobile server and that is stored in the wired server,
wherein an IP address of the mobile server is registered as the IP address of the wired server in a domain name system (DNS) server such that the wired server receives the request for access to the service of the mobile web server prior to the mobile web server.

9. The method of claim 8, wherein the request for access to the mobile web server comprises the URL indicating a location of content for the web service of the mobile web server.

10. The method of claim 8, further comprises determining whether a web service can be provided in place of the mobile web server, using the URL indicating a location of content for the web service of the mobile web server.

11. The method of claim 8, further comprising registering a new mobile web server using a URL of the new mobile web server.

12. The method of claim 11, wherein a login task is performed using the URL of the new mobile web server as an ID of the new mobile web server.

13. The method of claim 8, further comprising filtering the request for access to the mobile web server to restrict the request for access to the mobile web server.

14. A mobile web server for a mobile web service, the mobile web server comprising:
a user interface manager configured to provide a user interface with a user of the mobile web server;
a storage unit configured to store content for a mobile web service;
a communication unit configured to communicate with a wired server to register an IP address of the mobile web server in the wired server and to deliver content of the mobile web service to the wired server so that the wired server can provide the mobile web service in place of the mobile web server; and
a controller configured to control the communication unit and control an operation of the mobile web server,
wherein an IP address of the mobile server is registered as the IP address of the wired server in a domain name system (DNS) server such that the wired server receives a request for access to the mobile web service provided by the mobile web server prior to the mobile web server.

15. The mobile web server of claim 14, wherein the communication unit communicates with the wired server to register a URL of the mobile web server and use the URL as a user ID.

16. The mobile web server of claim 14, wherein the mobile web server is one of a portable phone, a personal digital assistant (PDA), a portable multimedia player device, a portable game console, and a portable camera device.

* * * * *